United States Patent Office 3,706,598
Patented Dec. 19, 1972

3,706,598
SOLID, GLASS-LIKE STARCH HYDROLYSATES HAVING HIGH DENSITIES
Peter K. Carrell, La Grange, Ill., assignor to CPC International Inc.
No Drawing. Filed July 15, 1970, Ser. No. 55,627
Int. Cl. C13l 1/08
U.S. Cl. 127—29
7 Claims

ABSTRACT OF THE DISCLOSURE

Solid, glass-like starch hydrolysate products having a dextrose equivalent of from about 10 to about 25, a water content of less than 15% by weight and a bulk density of at least about 40 pounds per cubic foot are produced by concentrating a hydrolyzed starch conversion liquor, heating the liquor in a plate heat exchanger, superheating minute droplets of the liquor and cooling to solidification.

---

The modification of starch by enzyme conversion or acid and enzyme conversion has resulted in a variety of new products useful in the food industry. The particular utility of these products depends mostly on the degree of conversion or breakdown of the starch molecules as indicated by the dextrose equivalent (D.E.) of the product. Many of these products, having a dextrose equivalent of from about 10 to about 25, are used as additives in soups and sauces wherein they act as bodying agents and viscosity controllers without imparting any flavoring to these foods. Other applications of such starch hydrolysates include their use in dehydrated foods as bulking agents and humectants.

The starch hydrolysates mentioned above are typically used in the solid form as powders. These powders are prepared by spray drying the starch conversion syrups in a heated air chamber and result in a finely divided product having a bulk density of about 35 pounds per cubic foot. In dissolving such powdered products in water, they have a tendency to float on the surface, forming lumps having a gummy exterior. These lumps become difficult to dissolve and require substantial agitation to effect dissolution.

There are many potential applications for starch hydrolysates having a dextrose equivalent of from about 10 to about 25 as bulking agents or bodying agents in foods which, upon addition to water, would sink below the surface and dissolve without agitation in exceedingly short periods of time. One such application is in automatic vending of foods, wherein a machine disperses a predetermined amount of solid material into hot water to form soup. The solid material dissolves and disperses in the water without agitation to result in the soup product.

It has now been found that a starch hydrolysate product of high bulk density having a dextrose equivalent of from about 10 to about 25 and having excellent wetability and solubility in water can be prepared. More specifically, the present invention resides in a solid, glass-like starch hydrolysate product having a dextrose equivalent of from about 10 to about 25, a water content of less than 15% by weight and a bulk density of at least about 40 pounds per cubic foot.

In a preferred embodiment of the present invention, the starch hydrolysate product has a dextrose equivalent of from about 12 to about 23 and a bulk density of from about 45 to about 55 pounds per cubic foot.

The term dextrose equivalent (D.E.) is used herein to refer to the reducing sugars content of the dissolved solids in a starch hydrolysate expressed as percent dextrose as measured by the Luff-Schorl method (NBS Circular C-40, page 195 as appearing in "Polarimetry, Saccharimetry, and the Sugars," authors, Frederick J. Bates and Associates).

The term bulk density is used herein to designate packed bulk density which is the weight of the particulate product per volume after having been packed by tapping or subjecting the container to some impact to insure settling of the particles. This packed bulk density can be determined by a standard procedure described in the standard analytical methods of the member companies of the Corn Refiners Assoc., Inc., 3rd edition, 1970, Method B-16 Bulk Density, issued May 20, 1963.

The starch hydrolysate products of the present invention are a new physical form of starch conversion syrup solids. No distinction on a chemical basis or composition of the products of this invention and the heretofore known starch hydrolysates having a similar dextrose equivalent is made. The physical nature and properties of the present product, however, differs substantially from the prior art conversion products which are prepared by spray drying. The most outstanding properties of the product of the present invention are its transparent hard glass-like form, its exceedingly high bulk density and its excellent wetting and solubility characteristics.

The products of the present invention are prepared by first hydrolyzing starch to a D.E. of from about 10 to about 25; concentrating the resulting product to a water content of less than about 15% by weight in the liquid phase; and thereafter cooling the product to solidification temperatures. The solidified product can then be ground or milled to a desired particle size for application in the food industry.

The initial starch which is subjected to hydrolysate treatment may be derived from a wide variety of starchy materials such as cereal starches, waxy starches, and/or root starches. Typical of these groups are corn starch, potato starch, tapioca starch, grain sorghum starch, waxy milo starch, waxy maize starch and the like. The term "starch hydrolysate" as used herein encompassed hydrolyzed starchy materials derived from a wide variety of starch sources known in the industry.

As hereinbefore stated, the starch hydrolysates preferred for use in the present invention are those having a D.E. ranging from about 10 to about 25 and which are made by any number of specific methods.

In one method referred to in Example 1 as Method A, a starch such as a waxy starch is treated with a single enzyme application of bacterial alpha amylase. More specifically, an aqueous slurry of a starch, having a solids content less than 50%, is subjected to the hydrolytic action of bacterial alpha amylase under suitable conditions of fermentation to produce a starch hydrolysate.

The same product as described above, may also be made via a number of other routes. For example, a mixture of starch and water having a solids content less than 50% may be first subjected to the hydrolytic action of a bacterial alpha amylase followed by a high temperature heating step to solubilize any unsolubilized starch. Since this temperature tends to inactivate the enzyme, it is then necessary to cool the solubilized partial hydrolysate and subject it to a second hydrolysis by treatment with additional bacterial alpha amylase to obtain the final starch hydrolysate. This method is referred to as Method B in Example 1.

A third method of making the preferred class of low D.E. starch hydrolysates referred to as Method C in Example 1, consists of hydrolyzing a mixture of starch and water by the action of acid to reach a D.E. between about 5 and about 15. The partial hydrolysate is subsequently subjected to the action of bacterial alpha amylase to obtain a starch hydrolysate having a D.E. of from about 10 to about 25.

The following example more specifically illustrates the preparation of the starch conversion syrups from which the products of this invention can be prepared. All percentages are by weight and temperatures are in degrees Fahrenheit unless otherwise stated.

EXAMPLE 1

The following specific procedures illustrate the above-described three basic methods for making the low D.E. starch hydrolysate used in this invention.

Method A—One-step enzyme technique

An aqueous starch slurry was prepared containing 30% solids by weight of waxy milo starch. The temperature of the slurry was raised and held between 85° C. and 92° C. A bacterial alpha amylase preparation was added in an amount just above 0.025% by weight of the starch over a period of slightly more than 30 minutes. The mixture was then held at the same temperature for an additional period of 30 minutes. The temperature was then reduced to below 80° C. and the conversion was allowed to continue until the desired D.E. was reached. The conversion was terminated by lowering the pH of the conversion product to from about 4.0 to about 4.5 upon the addition of hydrochloric acid solution.

Table 1 below sets forth typical saccharide analyses of low D.E. hydrolysates obtained in accordance with the above procedure. DP designates the degree of polymerization. $DP_1$ represents the total quantity expressed in percent by weight, dry basis, of monosaccharides present in the hydrolysate. $DP_2$ represents the total quantity of disaccharides present in the hydrolysate, and so forth.

TABLE 1
Typical Saccharide Analyses

| Hydrolysate composition | D.E. | | | |
|---|---|---|---|---|
| | 10 | 15 | 20 | 25 |
| $DP_1$ | 0.3 | 0.7 | 1.4 | 2.4 |
| $DP_2$ | 3.4 | 5.5 | 7.6 | 9.7 |
| $DP_3$ | 4.3 | 6.9 | 9.4 | 12.0 |
| $DP_4$ | 3.5 | 5.2 | 6.9 | 8.6 |
| $DP_5$ | 3.6 | 5.5 | 7.4 | 9.3 |
| $DP_6$ | 7.0 | 10.6 | 14.3 | 18.0 |
| $DP_7$ and higher | 77.9 | 65.6 | 53.0 | 40.0 |
| Total $DP_{1-6}$ | 22.1 | 34.4 | 47.0 | 60.0 |

Method B—Two-step enzyme-enzyme technique

Unmodified corn starch was slurried in water to provide an aqueous suspension containing 28–32% by weight of the unmodified corn starch. The pH was at 7.5–8.0. To this mixture was added bacterial alpha amylase (such as HT–1000, produced and marketed by Miles Chemical Laboratories) in an amount of 0.05% based on starch solids. This starch suspension was added over a 30 minute period to an agitated tank maintained at a temperature of 90–92° C. After completion of starch addition, liquefaction was continued for 60 minutes, after which time the hydrolysate was within the D.E. range of 2 to 5. The liquefied starch was then heated to 150° C. and held at this temperature for 8 minutes. The heat treatment destroyed residual enzyme activity and resulted in improved filtration rates and in decreased yield losses upon filtration.

Further saccharification to the final D.E. was accomplished by the addition of more HT–1000 bacterial alpha amylase after cooling the liquefied starch hydrolysate to a suitable temperature for conversion. The liquefied starch was cooled to 80–85° C. and HT–1000 added in an amount of 0.02% by weight starch solids. After 14 to 20 hours of conversion the desired terminal D.E. of 20 was obtained.

The final starch hydrolysate product was analyzed and the following analytical values were obtained.

TABLE 2

D.E.: 20.7; $DP_1$: 2.4; $DP_2$: 7.5; $DP_3$: 10.8; $DP_4$: 8.0; $DP_5$: 6.8; $DP_6$: 15.1; $DP_{7+}$: 49.4.

Method C—Two-step, acid-enzyme technique

Several samples of corn starch (A, B, & C) were slurried in water providing slurries having Baumes ranging from 14° to 22°. These slurries were partially acid hydrolyzed to a maximum of 15 D.E. The particular D.E. achieved by acid hydrolysate in each of the samples is set forth in Table 3 below. After acid hydrolysis, the slurry was neutralized to a pH between 6 and 7. The neutralized liquor was cooled to between 80° C. and 85° C., and dosed with bacterial alpha-amylase (HT–1000) in the quantity set forth below. A final D.E. of 19 to 21 was obtained in each of the samples in a period of time between 1 and 3 hours. The final conversion liquors are low TABLE 3
Enzyme Conversion Conditions

| Sample | D.E. of acid hydrolysate | Percent dry substance | Temp., °C. | pH | Enzyme dose | Time, hours | Final D.E. |
|---|---|---|---|---|---|---|---|
| A | 15.2 | 38.0 | 80 | 6.5 | 0.01 | 1 | 19.7 |
| B | 12.9 | 37.5 | 85 | 6.5 | 0.05 | 2 | 20.2 |
| C | 10.3 | 38.1 | 85 | 6.5 | 0.1 | 2 | 21.8 | in color. Table 3 above sets forth the reaction conditions for conversion product.

As previously indicated, the starch hydrolysate products of the present invention are prepared by concentrating the aqueous enzyme conversion liquors to a water content of less than 15% by weight. This concentration can be carried out by utilizing a vapor swept heat exchanger to effect the evaporation of the water from the conversion liquor. In the vapor swept exchanger, the starch conversion liquor enters at a concentration of from about 25% to about 50% solids into a plate heat exchanger close to its boiling point. The liquor then passes through a series of plates reaching its boiling point. The liquor is then transferred into minute droplets in a vapor phase. The stream is subjected to progressively decreasing pressures or progressively increasing temperatures along succeeding heating plates thereby causing the vapor to be superheated. This superheated vapor transfers heat to the liquid droplets by direct contact, effecting the concentration of the liquor. By this method, starch conversion syrups having low D.E. values, such as those of the present invention can be evaporated to a water content of less than about 15% by weight.

The preferred water content of a particular starch hydrolysate product of this invention, while it must be below 15%, varies inversely with the D.E. of the product. Thus, the products having the lower D.E. values have higher water contents. A product having a D.E. of from 10 to 15, for example, can have a water content of from 10 to 15% by weight while a product having a D.E. of from 20 to 25 preferably has a water content of from 5 to 10% by weight or less.

EXAMPLE 2

A refined corn starch hydrolysate which was prepared by the procedures detailed in Example 1, Method A, and having a solids content of about 30% by weight and a D.E. of 12 concentrated in a vapor swept heat exchanger (Parkson Continuous Evaporator) until the water content in the product was 13%. The product was then cooled and milled to pass a 20 mesh screen to yield a glass-like starch hydrolysate product of this invention having the following properties:

Dextrose equivalent—10
Water content—13
Bulk density—54

EXAMPLE 3

A refined corn starch hydrolysate which is prepared by the procedures detailed in Example 1, Method B, and having a solids content of about 35% by weight and a D.E. of 17 is concentrated in a vapor swept heat exchanger (Parkson Continuous Evaporator) until the water content in the product is 10%. The product is then cooled and milled to pass a 20 mesh screen to yield a glass-like starch hydrolysate product of this invention having the following properties:

Dextrose equivalent—17
Water content—10
Bulk density—54

EXAMPLE 4

A refined corn starch hydrolysate which was prepared by the procedures detailed in Example 1, Method C, and having a solids content of about 40% by weight and a D.E. of 22 concentrated in a vapor swept heat exchanger (Parkson Continuous Evaporator) until the water content in the product was 5%. The product was then cooled and milled to pass a 20 mesh screen to yield a glass-like starch hydrolysate product of this invention having the following properties:

Dextrose equivalent—22
Water content—5
Bulk density—54

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention.

I claim:

1. A solid, glass-like starch hydrolysate having a D.E. of from about 10 to about 25, a water content of less than 15% by weight, and a bulk density of at least about 40 pounds per cubic foot.

2. The starch hydrolysate product of claim 1 having a D.E. of from about 12 to about 23.

3. The starch hydrolysate product of claim 1 having a bulk density of from about 45 to about 55 pounds per cubic foot.

4. The starch hydrolysate product of claim 1 having a D.E. of from about 12 to about 23 and a bulk density of from about 45 to 55 pounds per cubic foot.

5. The starch hydrolysate product of claim 1 having a D.E. of about 12 and a bulk density of about 50 pounds per cubic foot.

6. A process for the production of a solid, glass-like starch hydrolysate having a D.E. of from about 10 to about 25, a water content of less than 15% by weight, and a bulk density of at least about 40 pounds per cubic foot which comprises:

(1) Concentrating a hydrolyzed starch conversion liquor having a D.E. of from about 10 to about 25 and a solids content of from about 25% to about 50% by weight by the steps comprising:
  (a) heating said liquor by passing the liquor through a series of plates in a plate heat exchanger;
  (b) transferring said heated liquor into minute droplets in a vapor phase; and
  (c) superheating said droplets by progressively decreasing the pressures or progressively increasing the temperature along a succeeding series of plates whereby said superheating of the vapor transfers heat to the liquid droplets by direct contact to effect concentration of the liquor;

(2) Thereafter cooling the concentrated liquor to solidification temperatures to obtain a solid, glass-like starch hydrolysate having a bulk density of at least about 40 pounds per cubic foot.

7. The process of claim 6, wherein the solidified product is ground or milled to an extent sufficient to pass through a 20 mesh screen.

References Cited

UNITED STATES PATENTS

| | | | |
|---|---|---|---|
| 2,245,309 | 6/1941 | Walsh | 127—30 |
| 2,192,951 | 3/1940 | Wolff | 127—29 |
| 3,560,343 | 2/1971 | Armbruster | 195—31 R |
| 2,965,520 | 12/1960 | Snyder | 195—31 R |

MORRIS O. WOLK, Primary Examiner

S. MARANTZ, Assistant Examiner

U.S. Cl. X.R.

99—141 R, 199 R; 127—38; 195—31 R